Patented Mar. 24, 1953

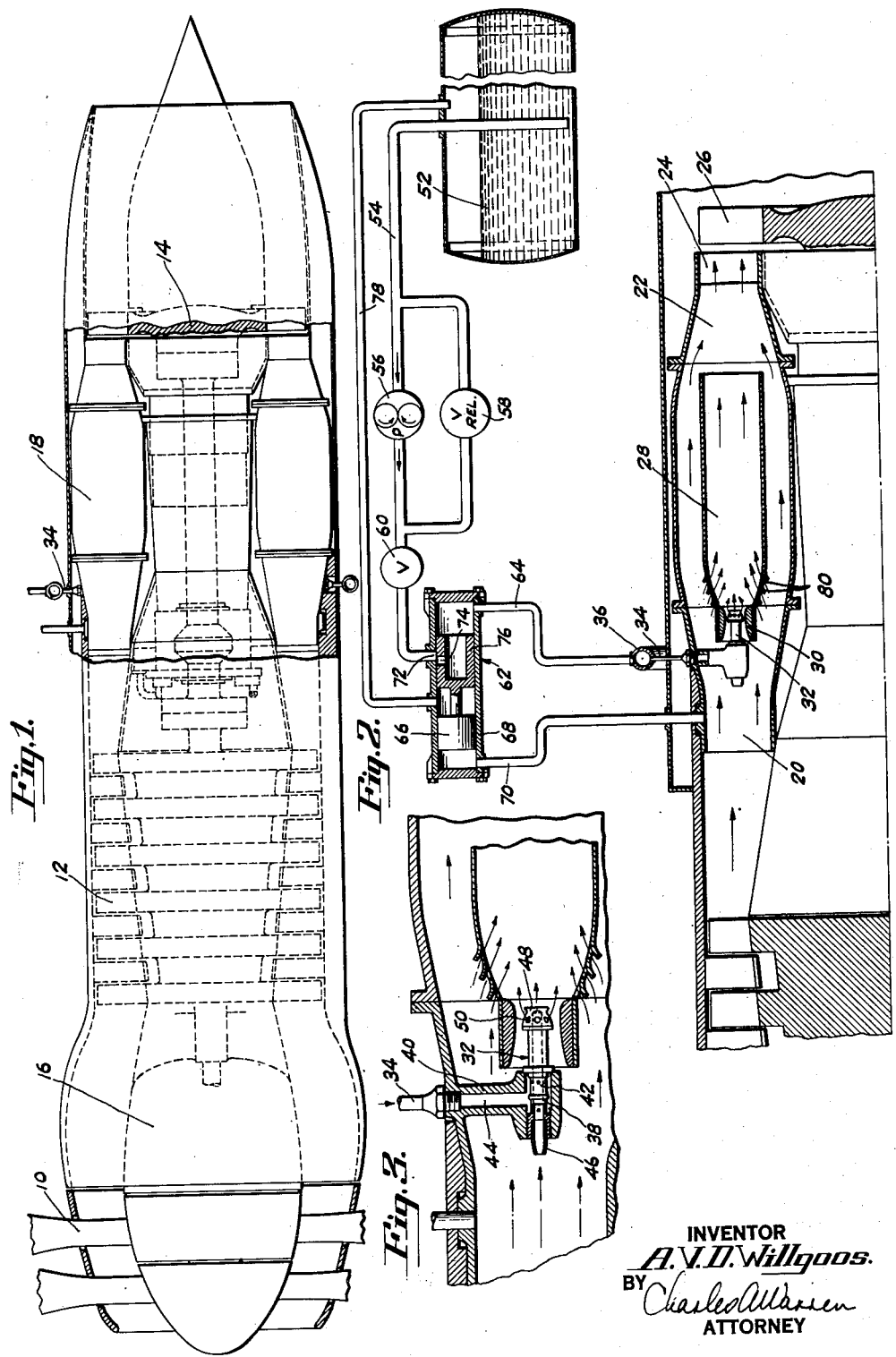

2,632,298

UNITED STATES PATENT OFFICE 2,632,298

FUEL CONTROL FOR TURBINE POWER PLANTS

Andrew V. D. Willgoos, East Hartford, Conn., assignor to United Aircraft Corporation, East Hartford, Conn., a corporation of Delaware Application August 15, 1947, Serial No. 768,815

2 Claims. (Cl. 60—39.28)

This invention relates to a control for the fuel supply to the combustion chamber of a compressor-turbine type of power plant.

In power plants operating where the density of the surrounding medium varies, as in aircraft power plants where the density of the air varies with altitude, the pressure of the air at the discharge end of the compressor prior to its entry into the combustion chamber or chambers is also variable. If the fuel nozzle is adapted for the delivery of fuel under such a pressure as to be entrained by the air flowing past it, a change in air pressure will cause a change in the rate of fuel flow unless some compensation for the variable pressure is made. A feature of this invention is an arrangement for adjusting the fuel pressure as a function of the change in pressure at the discharge end of the compressor or the pressure at the inlet to the combustion chamber.

One feature of the invention is an arrangement for maintaining a fuel pressure at the nozzle which is substantially proportional to the pressure of the air entering the combustion chamber, with the nozzle so arranged as to entrain the fuel in the air as it flows past the nozzle. Another feature is the location of the nozzle at the throat of a venturi through which a part of the air flows, thereby providing a slight pressure drop to assure a flow of fuel from the nozzle.

Other objects and advantages will be apparent from the specification and claims and from the accompanying drawing which illustrates an embodiment of the invention.

Fig. 1 is an elevation partly in section of a compressor-turbine power plant showing the fuel supply.

Fig. 2 is a fragmentary sectional view through one of the combustion chambers on a somewhat larger scale showing the fuel supply digrammatically.

Fig. 3 is a sectional view similar to Fig. 2 on a larger scale.

The invention is shown in connection with a propeller type of compressor-turbine power plant in which a propeller system 10 and a multistage axial flow compressor 12 are both driven from a turbine 14. The turbine is directly connected to the compressor and through a reduction gear in a housing 16 to the propeller system. Between the compressor and turbine is an arrangement for adding heat to the gas which, as shown, is a number of circumferentially spaced combustion chambers 18, the inlet 20 of which communicates with the discharge end of the compressor. The outlet 22 of the combustion chamber is connected to the nozzle ring 24 which directs the hot gas against the blades 26 of the turbine.

Each combustion chamber may have therein a centrally located sleeve 28 forming the primary chamber within which the combustion of fuel takes place. The inlet end of the sleeve may have a venturi 30, centrally of which is located the fuel nozzle 32. All of the nozzles are connected as by short pipes 34 to a distributor ring 36 surrounding the power plant.

The nozzles may be of any suitable construction; in the arrangement shown in Fig. 3, the nozzle 32 is of familiar carburetor construction and consists of a hollow tube 38 mounted in a supporting bracket 40 and having a number of radial passages 42 communicating with a fuel passage 44 in the bracket. Cooperating with the nozzle and in line with the tube 38 is an inlet pipe 46 having its inlet end smaller than the remainder to convert the velocity energy of the air entering the tube into pressure energy therein. The discharge end of the tube carries a head 48 having a number of radial passages 50 communicating with the hollow interior of the tube for the discharge of fuel into the air stream passing through the venturi 30. It will be noted that the head 48 is located approximately at the venturi throat, although adjustment of the fuel-air ratio may be obtained by longitudinally shifting the nozzle in the venturi.

Fuel is supplied from a tank 52 through a pipe 54 to a pump 56, the discharge pressure of which is maintained substantially constant by a pressure relief valve 58. A throttle valve 60 on the discharge side of the pump controls the supply of fuel to the pressure control valve 62 from which fuel reaches the distributor pipe through a conduit 64.

The pressure control valve 62 may comprise a plunger 66 within a cylinder 68 with one end of the cylinder connected as by a conduit 70 to the inlet of the combustion chamber so that the pressure acting on the end of the plunger 66 is the same as that at the inlet of the combustion chamber. The conduit 64 extends from the opposite end of the cylinder 68 to the distributor pipe 36. The fuel inlet pipe enters a port 72 in the cylinder spaced from the end of the cylinder and substantially in line with a port 74 in a cylindrical portion 76 of the plunger. By this arrangement the pressures in opposite ends of the cylinder are maintained equal. If the pressure at the inlet to the combustion chamber decreases, plunger 66 shifts to the left to place part 74 further out of alignment with port 72 to decrease the flow of fuel to the nozzle. Equilibrium is established when the pressures are again balanced. If the pressure at the inlet increases, plunger 66 shifts to the right to bring port 74 more nearly in alignment with port 72 to increase the flow of fuel until the pressures are balanced. A fuel return pipe 78 permits the return of any leakage fuel to the tank 52. By the arrangement shown, fuel is made available at the inlet to the nozzles 32, to be drawn into the burners in proportion to the flow of air through the venturis in which the nozzles are located.

In operation, air entering the combustion chamber passes around the cylinder 28 and also through the venturi 30 and into the cylinder. As it passes through the venturi, it entrains fuel escaping through the passages 50 and combustion of the fuel and air in the cylinder 28 occurs. Additional air may enter the cylinder 28 through passages 80 adjacent to the inlet end of the cylinder. Air entering the sleeve 46 also mixes with the fuel entering the tube 38 through the passages 42 and assists in the atomization of the fuel as it enters the air stream in the venturi. As the air pressure at the inlet 20 to the combustion chamber increases, the plunger 66 is moved to the right, thereby increasing the flow area through the port 74 and increasing the pressure in the righthand end of the cylinder 68 and therefore increasing the fuel pressure at the nozzle.

It is to be understood that the invention is not limited to the specific embodiment herein illustrated and described, but may be used in other ways without departure from its spirit as defined by the following claims.

I claim:

1. In an aircraft gas turbine power plant having a compressor, a burner, means for supplying fuel to said burner, and a nozzle within said burner through which fuel is admitted to said burner, that improvement for metering fuel which comprises a cylinder one end of which is connected to compressor discharge pressure and the other end of which is connected to nozzle pressure, a floating plunger within the cylinder, one end of the plunger being subject to compressor discharge pressure and the other end of the plunger being subject to nozzle pressure, means for admitting fuel to the interior of said cylinder, a port in the plunger wall, and a passage in the plunger whereby said port is vented to the nozzle pressure end of the plunger, the port shifting with respect to the fuel admitting means to meter fuel as a function of the pressure differential across the plunger and tending to maintain nozzle pressure substantially proportional to compressor discharge pressure.

2. In an aircraft gas turbine power plant having a compressor, a burner, means for supplying fuel to said burner, and a nozzle within said burner through which said fuel is admitted to said burner, that improvement which comprises a venturi mounted within the inlet of said burner, said nozzle being mounted within the throat of said venturi, a cylinder one end of which is connected to compressor discharge pressure and the other end of which is connected to nozzle pressure, a floating plunger within the cylinder, one end of the plunger being subject to compressor discharge pressure and the other end of the plunger being subject to nozzle pressure, means for admitting fuel to the interior of said cylinder, a port in the plunger wall, and a passage in the plunger whereby said port is vented to the nozzle pressure end of the plunger, the port shifting with respect to the fuel admitting means to meter fuel as a function of the pressure differential across the plunger and tending to maintain nozzle pressure substantially proportional to compressor discharge pressure.

ANDREW V. D. WILLGOOS.

REFERENCES CITED

The following references are of record in the file of this patent:

UNITED STATES PATENTS

| Number | Name | Date |
| --- | --- | --- |
| 1,052,588 | Janicki | Feb. 11, 1913 |
| 1,130,090 | Kutschinski | Mar. 2, 1915 |
| 1,346,509 | Olhovsky | July 13, 1920 |
| 1,510,688 | LaFon | Oct. 7, 1924 |
| 1,854,615 | Lasley | Apr. 19, 1932 |
| 2,078,957 | Lysholm | May 4, 1937 |
| 2,330,558 | Curtis | Sept. 28, 1943 |
| 2,424,035 | Ifield | July 15, 1947 |
| 2,438,998 | Halford | Apr. 6, 1948 |
| 2,474,404 | Richeson | June 28, 1949 |

FOREIGN PATENTS

| Number | Country | Date |
| --- | --- | --- |
| 493,174 | Great Britain | Oct. 4, 1938 |